United States Patent Office.

THEODORE SCHWARTZ, OF NEW YORK, N. Y.

Letters Patent No. 101,319, dated March 29, 1870.

IMPROVED PROCESS OF OBTAINING ACETIC ACID FROM WOOD.

The Schedule referred to in these Letters Patent and making part of the same.

*To all whom it may concern:*

Be it known that I, THEODORE SCHWARTZ, of the city, county, and State of New York, have invented certain new and useful Improvements in the Process of obtaining Acetic Acid; and I do hereby declare the following to be a full and correct description of the same.

The known method of manufacturing acetic acid consists in distilling from wood what is known as pyroligneous acid, a species of vinegar impregnated with tar, which, after laborious purification and preparation, is, by the addition of lime, converted into acetate of lime, from which, by decomposition with sulphuric or muriatic acid, the acetic acid is finally obtained.

The principal object of my invention is to lessen the cost of the acid, and to enable it to be produced in all localities where cord-wood is to be obtained, at whatever price, the economy of my process arising in great part from the fact that the wood subjected to it is not charred by the operation, but, after parting with its contained moisture and yielding all the acid which can be developed, retains a high value for the ordinary purposes to which wood is applied.

The nature of my invention consists in first driving off the moisture, unmixed with valuable elements, from the wood, by subjecting it, in a suitable closed chamber or vessel, to a temperature of 250° Fahrenheit, or thereabouts, and after it has lost about a quarter of its weight by parting with its contained water, gradually and slowly raising it to a temperature not exceeding 450° Fahrenheit, when the whole of the acid which can be developed will be obtained in a concentrated state, and nearly free from tar, while the wood will be browned throughout its texture, but will retain its tenacity and hardness and its capability of being worked by ordinary tools and applied to the purposes for which it was previously adapted.

My process, it will be perceived, obviates the necessity of converting the pyroligneous acid into acetate of lime, and the subsequent decomposition of the salt thus formed, and also prevents the depreciation of the wood, which would result from its conversion into charcoal.

The principles and practical facts on which my invention depends may be stated as follows:

First, when wood is heated to any temperature below 250° Fahrenheit it parts with water only, without suffering any appreciable loss of valuable material; and so great is the amount of moisture which may be thus removed that ordinary well-seasoned cord oak may be lightened twenty-five per cent. without waste of valuable matter.

Second, by continuing slowly to raise the temperature from 250° to about 450°, the wood is caused to gradually emit acetic acid and methylic alcohol, accompanied by oil, resin, and like products.

Third, all the acid-yield to be had from the wood under treatment can, by the process above described, be realized, and in a state of comparative concentration, without exceeding the temperature named, or allowing the distillation to proceed, as in the old process, to the point of carbonizing the wood. With due care even the formation of tar may be measurably prevented.

Fourth, after the extraction of the acid by this process the wood is found to retain somewhat more than half its original weight, say fifty-five per cent., and to be fully twice as heavy as if it had been reduced to charcoal. Its value for fuel is greater than when in the green state, owing to the absence of the moisture which would impede the combustion and lessen the intensity of the heat of the fire.

Fifth, as the exudation of moisture takes place exclusively from the ends of the pieces of wood there is evident advantage in reducing the fibre to short lengths by cross-grain incisions with a saw, or by operating on short blocks, slices of end wood, or small pieces of sticks, like common kindling-wood. The operation of heating is hastened by reducing the thickness of the pieces.

It may be observed that my process is capable of being carried on by means of well-known apparatus, familiar to persons skilled in the arts in which it is employed.

The retorts now used for the production of acetic acid by the destructive distillation of wood, although not so well adapted to the purpose as large iron chambers, may still be employed, by making the necessary changes in their dimensions and the method of their use which my process implies, to produce the the acid in the manner hereinbefore set forth.

Having thus fully described my invention,

I do not limit myself to any special form of apparatus, or to any exact temperatures, so long as the principle of my invention is adhered to; but What I do claim, and desire to secure by Letters Patent, is—

1. The preparation of the wood for distillation by subdividing it and shortening the fiber by transverse incisions, as and for the purpose described.

2. Subjecting the wood from which the acid is to be obtained to a temperature just sufficient to drive off its moisture, but not so high as to develop the acid, as set forth.

3. Subjecting the wood to a temperature just sufficient to develop and expel the acid, without charring the wood or reducing it to charcoal, as specified.

4. The production of acetic acid by the use, separately or conjointly, of one or more or any part of the processes specified in the foregoing claims, and explained in my specification.

The above specification of my said invention signed and witnessed at Washington, this 26th day of January, A. D. 1870.

THEODORE SCHWARTZ.

Witnesses:
A. C. BRADLEY,
CHAS. F. STANSBURY.